BEST AVAILABLE COPY

C. J. WEGER.

INTERNAL COMBUSTION ENGINE.

APPLICATION FILED NOV. 18, 1918.

Reissued Jan. 18, 1921.

15,031.

Inventor
Charles J. Weger
by Frank, Merkel & Fay
attorneys

UNITED STATES PATENT OFFICE.

CHARLES J. WEGER, OF CLEVELAND, OHIO, ASSIGNOR TO THE WEGER MOTOR COMPANY, OF CLEVELAND, OHIO, A CORPORATION OF OHIO.

INTERNAL-COMBUSTION ENGINE.

15,031. Specification of Reissued Letters Patent. Reissued Jan. 18, 1921.

Original application filed April 23, 1914, Serial No. 833,882. Renewed February 29, 1916, Serial No. 81,296. Original No. 1,206,741, dated November 28, 1916. Application for reissue filed November 18, 1918. Serial No. 263,100.

*To all whom it may concern:*

Be it known that I, CHARLES J. WEGER, a citizen of the United States, resident of Cleveland, county of Cuyahoga, and State of Ohio, have invented a new and useful Improvement in Internal-Combustion Engines, of which the following is a specification, the principle of the invention being herein explained and the best mode in which I have contemplated applying that principle, so as to distinguish it from other inventions.

My invention relates to internal combustion engines of the two-cycle type, the general object of the invention being to increase the efficiency of this class of engines and particularly to develop a maximum horsepower from a cylinder of a given diameter, one of the features of my invention contributing to such object being to complete scavenging of the gases of combustion generated in the cylinders.

One of the features of my invention is the provision of a feeding chamber for the explosion cylinder, pistons in said chamber and cylinder, and connections whereby said pistons are made to operate in fixed timed relation so that the explosion chamber becomes fully charged just prior to the final compression and ignition in such cylinder.

The said invention consists of means hereinafter fully described and particularly set forth in the claims.

This application furthermore forms the subject-matter of application, Serial No. 652,848, originally filed October 4, 1911, by the applicant.

The annexed drawing and the following description set forth in detail certain mechanism embodying my invention, the disclosed means, however, constituting but one of various forms in which the principle of the invention may be applied.

Figure 1:
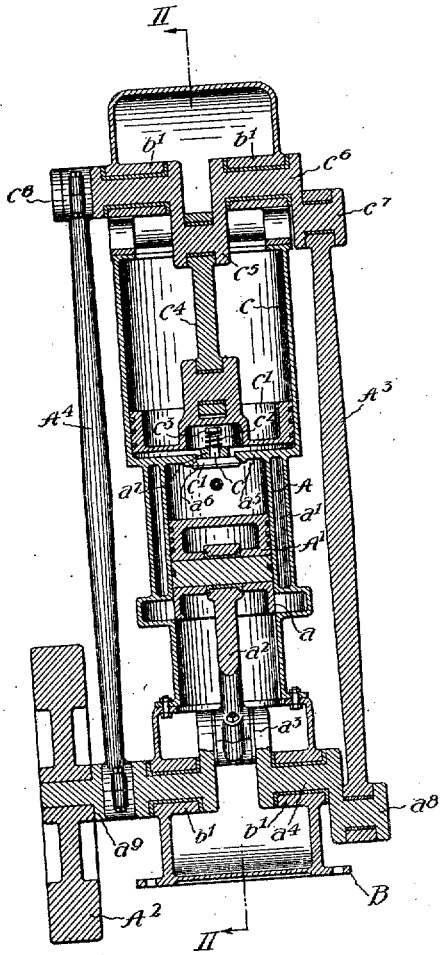
Figure 2:
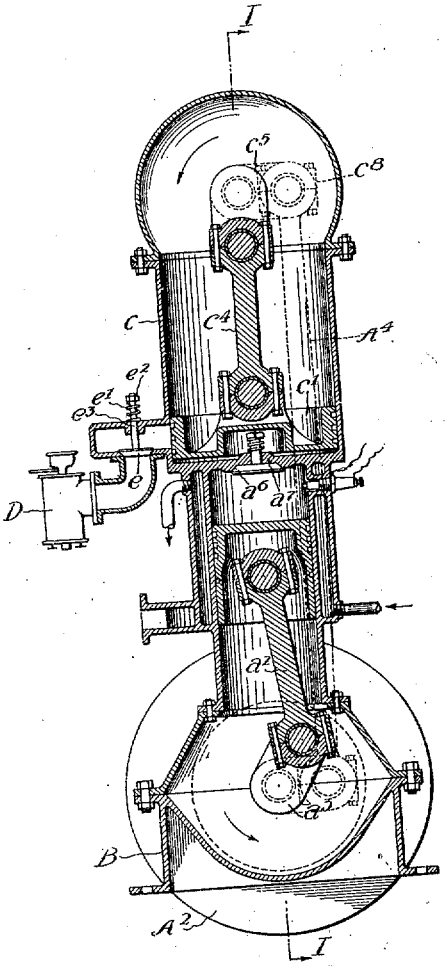

In said annexed drawing:

Figure 1 represents a vertical axial section of a two-cycle engine embodying my invention, taken upon the plane indicated by line I—I, Fig. 2, and Fig. 2 is a vertical axial section of same taken upon the plane indicated by line II—II, Fig. 1.

In the device illustrated the main or operating cylinder A is provided with the usual exhaust port $a$, the water space $a'$ forming a water-jacket, the piston A′, connecting rod $a^2$, crank $a^3$ and crank-shaft $a^4$, the latter being provided with the fly wheel $A^2$. The crank-shaft is mounted in suitable bearings $b'$ $b'$ formed in the housing B of the engine. The head $a^5$ of the cylinder is provided with a centrally-located valve-opening $a^6$ across which is formed a spider $a^7$, Fig. 2. This spider is bored to receive the valve-stem $c$ which carries upon its lower extremity the puppet-valve $c'$ which controls said opening and which opens inwardly with respect to the cylinder A. The said valve is kept normally closed by means of a helical spring $c^2$ introduced between the spider and the nut $c^3$ secured to the upper end of the stem, as will be understood.

Superimposed on the cylinder A is a second cylinder C with whose interior the interior of cylinder A communicates through the medium of the valve-opening $a^6$. The interior of cylinder C furthermore communicates at its lower end with a carbureter D, such communication being controlled by a check-valve $e$, Fig. 2, which opens inwardly with respect to such interior, and is kept normally closed by means of a helical spring $e'$ introduced between the housing-structure and a nut $e^2$ secured to the outer end of the stem $e^3$ of said valve. The piston C′ operates in this latter cylinder and is provided with a connecting rod $c^4$ whose upper end is connected with a crank $c^5$ formed on a crank-shaft $c^6$, which is mounted in suitable bearings $b'$ $b'$ formed in the upper part of the frame or housing of the machine. The upper and lower parts of the housing, which provide supports for the crank-shaft, are separable from the outer ends of the cylinders respectively, to which they are secured by suitable bolts, as will be understood, the joint between the lower housing and the lower end of the lower cylinder being made gas-tight in the usual manner. The dividing wall between the two cylinders forms a common inner head for the two cylinders.

The outer ends of the crank-shafts $a^4$ and $c^6$ are provided with cranks $a^8$, $c^7$ and $a^9$ and $c^8$ respectively, which are connected with each other by means of side rods $A^3$ and $A^4$ respectively, as shown. Cranks $a^8$ and $a^9$ are placed so as to occupy positions relatively to each other such as will form angles of ninety degrees (90°), for the purpose of overcoming a possible dead-center, as will be readily understood. Cranks $a^3$ and $a^5$ are so arranged with reference to each other that the pistons A′ and C′ will, during their operation approach and recede from each other. The arrangement of these cranks is further such that they will form angles of different degrees at any given instant, with reference to a given plane, such as a plane perpendicular to the common axis of the cylinders, whereby the piston C′ will be caused to operate slightly in advance of piston A′, that is, it will reach its lowermost position in its stroke at a time somewhat in advance of that at which the piston A′ will reach the uppermost portion of its stroke, as shown in the drawing. The diameter of cylinder C is made somewhat greater than that of cylinder A so as to give piston C′ a greater displacement than piston A′, as shown, and for a purpose hereinafter specified. Cylinder C is of a length such as to allow piston C′ to reach a point much nearer the common cylinder head than does the piston A′, the upper end of the stroke of the latter being such as to provide the usual space necessary to form an explosion-chamber.

The above-described device operates as follows: Assuming the parts to be in the positions shown in Figs. 1 and 2, and the upper end of the interior of the cylinder A to be filled with compressed hydrocarbon mixture, the rotation of the crank-shafts will cause the piston C′ to move upwardly, piston A′ also moving upwardly and approaching the extreme upper portion of its stroke. The mixture in the cylinder A will therefore be still further slightly compressed, valve $c'$ remaining closed. Immediately after the piston A′ has reached such upper end of the stroke, ignition takes place and the compressed mixture explodes, thereby driving the said piston downwardly in the cylinder, piston C′ continuing in its upward movement. The action of the piston C′ during its upward movement causes an influx of the hydrocarbon mixture into the bottom of cylinder C, the valve $c$ opening as a result thereof, as will be understood. During the downward travel of the piston A′ it uncovers the exhaust port $a$, thereby permitting the major portion of the gases of combustion to be discharged therethrough. Before the piston A′ reaches the lowermost end of the stroke, piston C′ will have reached the uppermost portion of its stroke and will begin its return movement while the exhaust port $a$ is still open, while the piston A′ is reaching the lowermost end of its stroke and during a part of the time that such latter piston is on its return stroke. The interior of cylinder C will meanwhile have been completely filled with the hydrocarbon mixture and the valve $c'$ will have remained closed during the above-described operation. The return movement of the piston C′ will therefore cause the mixture in cylinder C to open the valve $c'$ and thereupon force such mixture into the cylinder A. This operation takes place during a time in which the exhaust port $a$ is open, and the mixture flowing into the cylinder A drives before it any remaining gases of combustion present in such cylinder, and out through the exhaust port $a$, thus completely scavenging this cylinder. The further upward movement of piston A′, closes port $a$, but piston C′ continues to force the mixture into the cylinder A and compresses same therein, piston A′ assisting in this compression. The piston C′, however, being slightly in advance of piston A′, the pressure in cylinder C exceeds that in cylinder A and the valve $c'$ remains open to permit of the free passage of the compressed mixture into cylinder A. Immediately after the piston C′ begins its upward stroke, the pressure in the cylinder A will exceed that in cylinder C, and the valve $c'$ will close, thereby arranging the parts again for the explosion and causing them to assume the position described in the beginning of the operation and as shown in the drawing.

The arrangement whereby the piston C′ approaches the cylinder-head much more closely than does piston A′, effects a greater amount of pressure in the cylinder C than is effected in the cylinder A, and the excess of pressure in the cylinder C which is necessary to open the valve $c'$ throughout the inward stroke of piston C′ is thereby always assured. By making the displacement of piston C′ exceed that of the piston A′ it will be seen that a larger amount of mixture may be drawn from the carbureter for the same length of stroke of piston C′ as that to which piston A′ is subjected. A greater amount of mixture is therefore compressed into the space above piston A′ than could be introduced therein by means of the said piston A′ alone. Such amount may be further augmented if desired by increasing the length of cylinder C and increasing the throw of the cranks. It will therefore be seen that, as compared with the ordinary construction of two cycle engines, a greater pressure may be produced in the explosion chamber of cylinder A′ as a result of compressing a greater amount of mixture into said chamber, or the said space may be enlarged so that a greater amount of mixture may be compressed therein at a pressure substantially equal to that ordinarily obtained. In either case the combustion of the gas produces a much higher pressure on the piston than can be produced in the ordinary construction heretofore used, and a greater horsepower for a given cylinder's diameter and stroke of piston is thereby obtained.

Having fully described my invention, what I claim therefor and desire to secure by Letters Patent is:

1. In an internal combustion engine, the combination of the working-cylinder and piston, a portion of the interior of said cylinder forming a firing-chamber; ignition-means communicating with the latter; a separate cylinder communicating with the source of supply of the explosive mixture; a piston of greater displacement, greater than that of the cylinder piston in said latter cylinder; a valve for controlling communication between said two cylinders; a valve for controlling communication between said separate cylinder and said source of supply; and means connecting said pistons and so arranged that a definite and predetermined relationship of the piston movements is obtained, said means being furthermore set so as to allow the pistons to move in opposite directions throughout a part of their respective strokes and to discharge the first part of the fuel charge into the working cylinder for scavenging effect; said first-named valve being arranged to cut off communication between the two cylinders at the time of the explosion of the mixture in the firing chamber.

2. In an internal combustion engine, the combination of the working-cylinder and piston, a portion of the interior of said cylinder forming a firing-chamber; ignition-means communicating with the latter; a separate cylinder communicating with the source of supply of the explosive mixture; a piston in said latter cylinder; a valve for controlling communication between said two cylinders; a valve for controlling communication between said separate cylinder and said source of supply; two shafts, means connecting said pistons with said shafts respectively; and means connecting said shafts whereby a definite and predetermined relationship of the piston movements is obtained, said connecting means and shafts being set so as to allow the pistons to move in opposite directions throughout a part of their respective strokes; said first-named valve being arranged to cut off communication between the two cylinders at the time of the explosion of the mixture in the firing chamber.

3. In an internal combustion engine, the combination of the working-cylinder and piston, a portion of the interior of said cylinder forming a firing-chamber; ignition-means communicating with the latter; a separate cylinder communicating with the source of supply of the explosive mixture; a piston in said latter cylinder; a valve for controlling communication between said two cylinders; a valve for controlling communication between said separate cylinder and said source of supply; two crank-shafts and connecting-rods connecting said pistons with said shafts respectively; and means connecting said crank-shafts whereby a definite and predetermined relationship of the piston movements is obtained, said connecting rods and crank-shafts being set so as to allow the pistons to move in opposite directions throughout a part of their respective strokes; said first-named valve being arranged to cut off communication between the two cylinders at the time of the explosion of the mixture in the firing chamber.

4. In an internal combustion engine, the combination of a working-cylinder and piston, a part of the interior of said cylinder forming a firing-chamber; ignition-means communicating with the latter; a separate cylinder of greater diameter than said working-cylinder, and communicating with the source of supply of the explosive mixture; a piston in the latter cylinder; a valve for controlling communication between said separate cylinder and said source of supply; two crank-shafts and connecting-rods connecting said pistons with said shafts respectively; means connecting said two crank-shafts, whereby a definite and predetermined relationship of the piston movements is obtained; said crank-shafts and connecting-rods being set so as to cause said pistons to move in opposite directions throughout a part of their respective strokes; said first-named valve being arranged to cut off communication between the two cylinders at the time of the explosion of the mixture in said firing-chamber.

5. In an internal combustion engine, the combination of the working-cylinder and piston, a part of said cylinder forming a firing-chamber; ignition means communicating with the latter; a separate cylinder communicating with the source of supply of the explosive mixture; a piston in said latter cylinder; a valve for controlling communication between said two cylinders; a valve for controlling communication between said separate cylinder and said source of supply; crank-shafts mounted adjacent to the outer ends of said two cylinders respectively; connecting-rods connecting said pistons with said crank-shafts respectively; each of said crank-shafts being provided with two additional cranks; and two additional connecting-rods having their opposite ends connected with one of said additional cranks on each of said crank-shafts.

6. In an internal combustion engine, the combination of the working-cylinder and piston; a separate compression-cylinder and piston therefor communicating therewith; a valve opening inwardly with respect to said working-cylinder and controlling such communication, said valve arranged to depend for its operation upon the pressure of the gases in such cylinders; said compression-cylinder communicating with a source of supply of explosive mixture; an automatically-operating valve for controlling such last-named communication and opening inwardly with respect to such compression-cylinder; two crank-shafts suitably mounted; two connecting-rods mounted upon the cranks on said crank-shafts and connected respectively with the said pistons; said shafts being arranged to reciprocate said pistons in opposite directions throughout a part only of their respective strokes; said crank-shafts being provided with additional cranks; and connecting-rods joining the additional cranks of one shaft to those of the other shaft.

7. In an internal combustion engine, the combination of the working-cylinder and piston therefor; a separate compression-cylinder and piston placed end to end therewith; a passage-way providing communication between the contiguous ends of said cylinders; a spring-held puppet-valve opening inwardly with respect to said working-cylinder and controlling such communication; said compression-cylinder communicating with a source of supply of explosive mixture; a spring-held puppet-valve opening inwardly with respect to such compression-cylinder and controlling such last-named communication, two crank-shafts suitably mounted; two connecting-rods connecting such crank-shafts with said pistons respectively; said two shafts being arranged so as to reciprocate said pistons in opposite directions throughout a part only of their respective strokes; each such crank-shaft being provided with two additional cranks; connecting-rods each connecting one such additional crank of one of said shafts to a similar crank of the other shaft; the additional cranks of each shaft being angularly related to each other.

8. In an internal combustion engine, the combination of a working-cylinder and piston of the two-cycle type; an inclosing housing secured to the outer end of such cylinder; a compression-cylinder and piston, said two cylinders being placed end to end and having a common dividing wall forming a common head for such cylinders; a passage-way in said head; a spring-held puppet-valve opening inwardly with respect to said working-cylinder and adapted to be actuated by the compression of the gases in such cylinders; said compression-cylinder communicating with a source of explosive mixture; a spring-held puppet-valve controlling such last named communication and opening inwardly with respect to such compression-cylinder; an inclosing housing mounted upon the outer end of said compression-cylinder; crank-shafts mounted in said two housings respectively; connecting-rods connecting said crank-shafts and pistons respectively; said crank-shafts each being provided with two additional cranks angularly related to each other, the angular relation of one set of such cranks being identical with that of the other of such sets; and connecting-rods connecting one additional crank of one shaft to the corresponding additional crank of the other shafts.

Signed by me, this 16th day of November, 1918.

CHARLES J. WEGER.